United States Patent
Svetal

(10) Patent No.: US 6,260,763 B1
(45) Date of Patent: Jul. 17, 2001

(54) INTEGRAL ILLUMINATION SOURCE/ COLLECTION LENS ASSEMBLY FOR DATA READING SYSTEM

(75) Inventor: Michael P. Svetal, Eugene, OR (US)

(73) Assignee: PSC Scanning, Inc., Eugene, OR (US)

( * ) Notice: Subject to any disclaimer, the term of this patent is extended or adjusted under 35 U.S.C. 154(b) by 0 days.

(21) Appl. No.: 09/271,592

(22) Filed: Feb. 23, 1999

Related U.S. Application Data

(63) Continuation of application No. 08/794,067, filed on Feb. 4, 1997, now abandoned.
(60) Provisional application No. 60/011,235, filed on Feb. 6, 1996.

(51) Int. Cl.[7] ............... G02B 26/08; G06K 7/10
(52) U.S. Cl. ............... 235/462.22; 235/454; 235/462.35; 235/462.42; 359/205
(58) Field of Search .................. 235/462.22, 462.35, 235/462.42, 454; 359/205, 206, 207

(56) References Cited

U.S. PATENT DOCUMENTS

| | | | |
|---|---|---|---|
| 4,143,809 | 3/1979 | Uebbing et al. | 235/462 |
| 4,939,356 | * 7/1990 | Rando et al. | 235/467 |
| 5,073,702 | * 12/1991 | Schuhmacher | 235/467 |
| 5,144,120 | 9/1992 | Krichever et al. | 235/472 |
| 5,187,353 | 2/1993 | Metlitsky et al. | 235/462 |
| 5,196,683 | 3/1993 | Marom et al. | 235/462 |
| 5,254,844 | 10/1993 | Krichever et al. | 235/462 |
| 5,386,107 | 1/1995 | Dvorkis et al. | 235/472 |
| 5,422,744 | 6/1995 | Katz et al. | 359/2 |
| 5,424,825 | 6/1995 | Delhaye et al. | 356/318 |
| 5,525,791 | 6/1996 | Krichever et al. | 235/472 |
| 5,565,668 | * 10/1996 | Reddersen et al. | 235/462 |
| 5,583,332 | 12/1996 | Krichever et al. | 235/462 |
| 5,602,379 | 2/1997 | Uchimura et al. | 235/472 |
| 5,744,788 | * 4/1998 | Metlisky et al. | 235/462 |
| 5,770,847 | * 6/1998 | Olmstead | 235/462 |
| 5,798,512 | 8/1998 | Krichever et al. | 235/472 |
| 5,808,775 | * 9/1998 | Inagaki et al. | 359/205 |
| 5,814,803 | * 9/1998 | Olmstead et al. | 235/462 |
| 6,105,869 | * 8/2000 | Scharf et al. | 235/462.41 |

OTHER PUBLICATIONS

McGeorge, Scott, Imaging Systems: Detectors of the Past, Present and Future, Spectroscopy, vol. 2, No. 4 (1987), pp. 1–6.

* cited by examiner

Primary Examiner—Michael G. Lee
Assistant Examiner—U-Chau Le
(74) Attorney, Agent, or Firm—Lyon & Lyon LLP

(57) ABSTRACT

A barcode scan module having an optical lens system with a central bore, an outer collection lens section, an inner beam focusing lens section, and an illumination source mounted within the central bore to form an integrated assembly, such an assembly may also include a photodetector array with all these components integrally mounted on a printed circuit board. The scan module may also integrate one or more of the following components: power supply and control electronics for the illumination source; power supply and control electronics for the scan engine; power supply and control electronics for the photodetector; and signal processing and/or decoding electronics for processing and/or decoding the scanned barcode signal produced by the barcode scan module.

14 Claims, 3 Drawing Sheets

INTEGRAL ILLUMINATION SOURCE/ COLLECTION LENS ASSEMBLY FOR DATA READING SYSTEM

This application is a continuation in part of application Ser. No. 08/794,067 Feb. 4, 1997, now abandoned, which is a continuing application of Ser. No. 60/011,235 filed Feb. 6, 1996.

BACKGROUND

The field of the present invention relates to data readers and in particular to light generation and collection systems suitable for reading of symbols such as barcode labels.

A barcode label comprises a series of parallel dark bars of varying widths with intervening light spaces, also of varying widths. The information encoded in the barcode is represented by the specific sequence of bar and space widths, the precise nature of this representation depending on which particular barcode symbology is in use. Typical methods for reading barcodes comprise generation of an electronic signal wherein a signal voltage alternates between two preset voltage levels, one representing a dark bar and the other representing a light space. The temporal widths of these alternating pulses of high and low voltage levels correspond to the spatial widths of the bars and spaces. It is this temporal sequence of alternating voltage pulses of varying widths which is presented to an electronic decoding apparatus for decoding.

One common type of bar code readers are spot scanners in which a source of illumination is moved (i.e., scanned) across the barcode while a photodetector monitors the reflected or backscattered light. For example, the photodetector may generate a high voltage when a large amount of light scattered from the barcode impinges on the detector, as from a light space, and likewise may produce a low voltage when a small amount of light scattered from the barcode impinges on the photodetector, as from a dark bar. The illumination source in spot scanners is a typically a laser, but may comprise a coherent light source (such as a laser or laser diode) or non-coherent light source (such as light emitting diode). A laser illumination source may offer advantages of higher intensity illumination which may allow barcodes to be read over a larger range of distances from the barcode scanner (large depth of field) and under a wider range of background illumination conditions.

The reading spot of the scanner may be manually moved across the bar code, this type of reader being typically referred to as a wand. Alternately, the spot may be automatically moved or scanned across the bar code in a controlled pattern. A scanning mechanism may comprise a rotating mirror facet wheel, an oscillating mirror, or other suitable means for repetitively moving the illumination beam. The path followed by the scanned illumination beam is referred to as a scan line. Typically, an individual scan line extends across the barcode for the barcode to be successfully read unless specialized piecing software (known as stitching) or electronics are utilized. In addition to the scan engine, a barcode scanner may also employ a set of scan pattern generating optics to produce a multiplicity of scan lines in various directions from the scanner and at varying orientations, thereby allowing barcodes to be read over a large angular field of view and over a wide range of orientations (i.e., a multi-dimensional scan pattern). The scan pattern generating optics typically comprise a set of mirrors aligned at varying angles, each of which intercepts the illumination beam during a portion of its motion and projects it into the region in front of the barcode scanner, hereinafter referred to as the scan volume. Each mirror or mirror set, in conjunction with the scanning mechanism, produces a scan line at a particular position and at a particular orientation.

Another type of data reader is an image reader, such as a CCD reader (charge coupled device), in which an entire line of the bar code image is focused onto a detector array. A CCD reader typically includes a light source to illuminate the bar code to provide the required signal response. For the purposes of this description, the word "scanner" may refer to data readers of both the spot scanner type and the line scanner imaging type. The following description will focus on barcode reading, but is generally applicable other types of symbol reading or object identification.

FIG. 1 illustrates a typical laser barcode scan module 100 in which an illumination beam 102 from a laser 104 is directed by a steering mirror 106 through a lens 108. Lens 108 may serve as a collimation or focusing lens for the illumination beam 102 in addition to its primary function of collecting light 109 from the barcode 110 and focusing it onto photodetector 112. After passing through the lens 108, the illumination beam 102 impinges on a scan engine 114, which may comprise a rotating mirror facet wheel, an oscillating mirror, holographic disk or other scanning mechanism for scanning the illumination beam 102 across the barcode 110. The reflected or refracted light 109 from barcode 110 is collected by lens 108 and, bypassing steering mirror 106, is focused onto detector 112, where the light intensity is converted to an electrical signal. The electrical signal is then passed from the barcode scan module 100 to signal processing and/or decoding electronics 116.

Though the optical layout of barcode scan module 100 was useful, the present inventors have recognized that there are still improvements that can be effected. The optical layout occupies a relatively large amount of space due to the need for steering mirror 106 to direct the illumination beam 102 along the optical collection path. The steering mirror 106 also decreases the collection efficiency of lens 108 by obstructing a portion of the collected backscattered light 109. This inefficiency in turn necessitates the use of a larger diameter, longer focal length collection lens 108, and/or the use of a higher power laser 104. Further, since the focusing requirements for the scanned illumination beam 102 and the collection system are typically quite different, additional illumination beam focusing optics may be required between laser 104 and steering mirror 106. Alternatively, lens 108 may comprise a complex multi-focus optic, with a central portion 108a configured for the scanned illumination beam 102 and the outer portion configured for collection.

The layout of module 100 is also sensitive to relative misalignment of laser 104, steering mirror 106, lens 108, and detector 112. Detector 112 and lens 108 define a volume of space in front of the barcode scan module from which reflected light 109 is most efficiently collected and focused onto photodetector 112. Unless laser 104 and steering mirror 106 are aligned so that the illumination beam 102 traverses this collection volume, the barcode scan module will not function efficiently. The scan module 100 may therefore be complex and expensive to manufacture, requiring a large number of parts and tight manufacturing tolerances. It is also bulky due to the constraints imposed by the relatively large number of components comprising the optical system.

SUMMARY OF THE DISCLOSURE

The present invention is directed to a data reader module such as a barcode scan module wherein the illumination source and optical collection system are form in an integral assembly eliminating the need for any steering optics located between the collection lens and the photodetector or between the light source and the collection lens.

In its preferred configuration, the construction allows efficient collection of the reflected and/or backscattered light with a smaller, shorter focal length collection lens. The number of parts required is also minimized, and manufacturing tolerances are relaxed since the relative alignment of the illumination beam and the optical collection system is fixed. The illumination source, beam focusing lens, optical collection system, and photodetector may be integrated as a single structure mounted on a printed circuit board, also on which may be implemented one or more of the following: power supply and control electronics for the illumination source; power supply and control electronics for the scan engine; power supply and control electronics for the photodetector; and signal processing and/or decoding electronics for processing and/or decoding the scanned barcode signal produced by the barcode scan module.

DETAILED DESCRIPTION OF THE PREFERRED EMBODIMENTS

The preferred embodiments will now be described with respect to the drawings. For clarity of description, any identifying numeral representing an element in one figure will represent the same element when used in any other figure.

Figure 1:
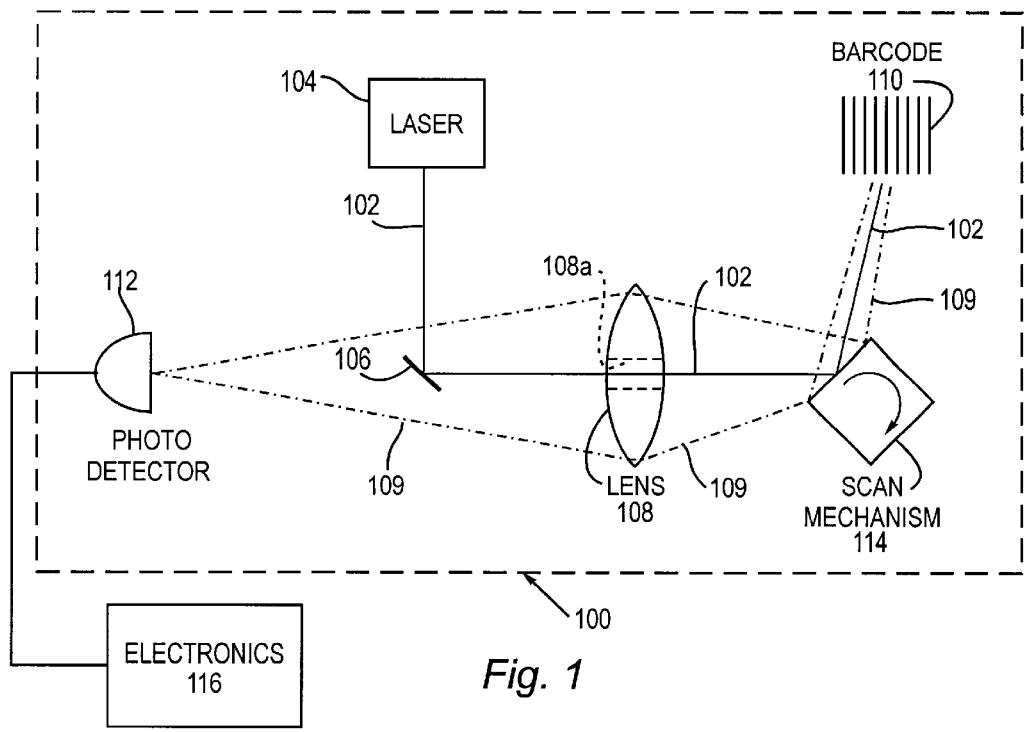
FIG. 1 is a schematic of a typical laser barcode scan module.
Figure 2:
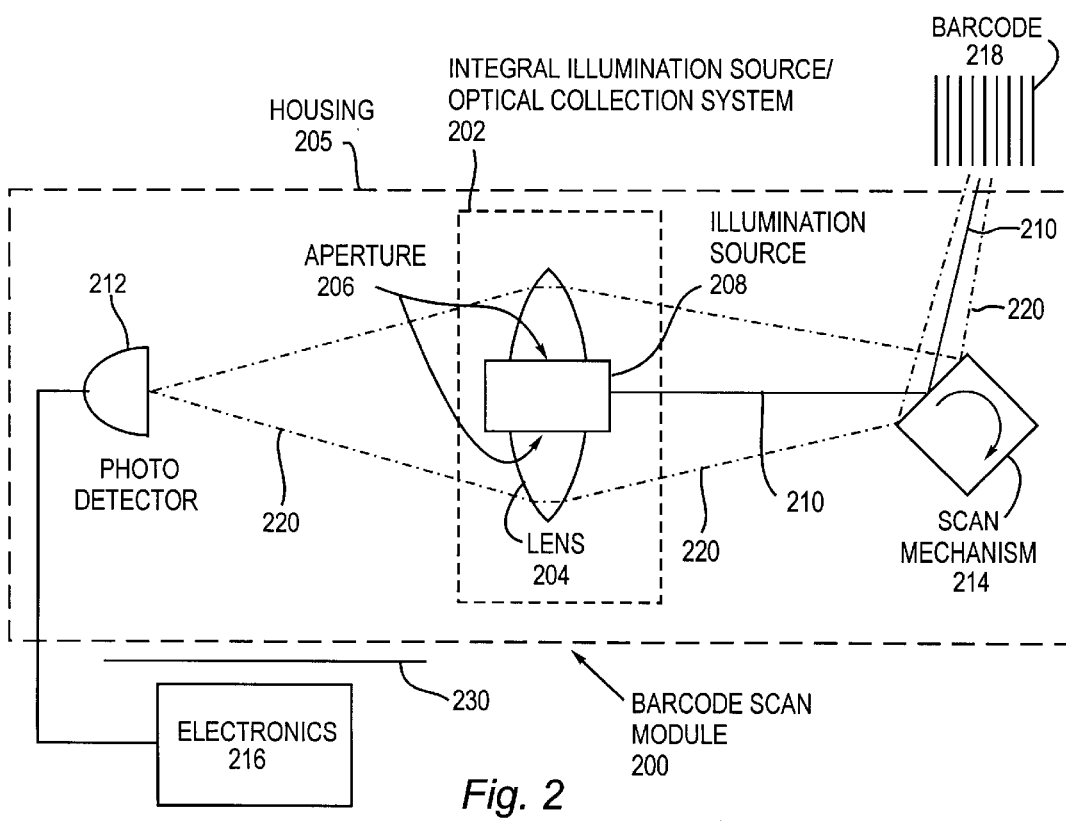
FIG. 2 is a shematic of a moving spot data reader according to a first embodiment of present invention.

FIG. 2 illustrates a preferred embodiment of a barcode scan module 200 with an integral illumination source/optical collection system 202. The barcode scan module of FIG. 2 includes:

an integrated illumination source/optical collection system 202 comprised of (a) an optical collection system 204 with a central aperture 206a and (b) a light source 208 for producing illumination beam 210, the light source 208 being rigidly mounted within the central aperture 206 of optical collection system 204;

a photodetector 212; and a scan mechanism illustrated as a rotating polygon mirror 214. The barcode scan module 200 and signal processing and decoding electronics 216 may together comprise an integrated barcode scanner, i.e., a data reader all located within a housing 205.

In a preferred embodiment of barcode scan module 200, the illumination source 208 comprises a focused visible laser diode module (VLDM). Such VLDMs are known to those skilled in the art and typically comprise a standard visible laser diode with integrally mounted aperture and focusing optics. The optics and aperture transform the divergent and astigmatic output beam of the laser diode, as desired, to be collimated or focused at a point (ie., waist location) in front of the laser diode. Alternately, the barcode scan module 200 may incorporate any illumination source, preferably one which produces a sufficiently intense illumination beam 210 with spatial characteristics allowing a "small", well-defined illumination spot to be projected onto a barcode 218. In barcode scanning applications, "small" generally means smaller than the 2× narrowest bar or space in the barcode scanned within the scan volume. A beam larger than this size is unable to properly resolve the barcode.

In one preferred embodiment of barcode scan module 200, the optical collection system 202 comprises one single-focus lens 204 with a central aperture 206, the illumination source 208 being rigidly mounted within a central aperture 206. The aperture 206 is preferably central, i.e., it is located at the center of the lens 204. In its preferred configuration, the illumination source 208 such as a VLDM is mounted coaxially with and within the lens 204 such that the outgoing laser beam 210 coincides with the focal axis of the lens 204. The aperture 206 and VLDM 208 need not be centrally/coaxially positioned within the lens 204, but such a location may facilitate manufacture and alignment. If the aperture 206 and VLDM 208 were positioned off axis, the outgoing beam 210 may still be aimed parallel to the focal axis of the lens 204.

The lens 204 collects the reflected and/or backscattered light 220 from barcode 218 and focuses it onto photodetector 212. The voltages thus generated are then passed to signal processing and/or decoding electronics 216. The barcode scan module 200 may incorporate other optical collection systems, provided that the illumination source 208 is rigidly mounted within an element of the optical collection system 204. By mounting or otherwise integrally forming the illumination source 208 within the optical collection system 204 to produce a single integral unit 202, the number of components required is reduced and proper alignment of the illumination source and the optical collection system is more readily assured.

Suitable optical collection systems may include but are not limited to: one multi-focus lens element; a plurality of single- and/or multi-focus lens elements; one or more mirrors, either alone or in combination with one or more lenses. These lens and/or mirrors may be reflective, refractive, or diffractive in nature, or in any combination. For example, a second collection lens element may be located downstream (i.e. to the right as viewed in FIG. 2) of the VLDM 208. The second collection lens element would cooperate with lens 204 for collecting and focusing light onto the photodetector 212. The second collection lens may include a central aperture, which could be very small as only the beam 210 need pass therethrough, or the central aperture may be replaced with a lens element for focusing the outgoing beam 210. A second collection lens element may be positioned downstream (i.e. to the left as viewed in FIG. 2) of the VLDM 208. The downstream collection lens element need not include an aperture.

The integral illumination source/optical collection system 202 may include further outgoing beam focusing elements such for example as those disclosed in U.S. Pat. No. 5,479,011, hereby incorporated by reference. U.S. Pat. No. 5,479,011 discloses several configurations for LCD systems which may be highly compact yet provide for active beam focusing.

In a preferred embodiment of barcode scan module 200, the scan mechanism 214 may comprise any means for scanning the illumination beam 208 across barcode 218, including but not limited to a rotating mirror facet wheel (such as facet wheel 214 illustrated in FIG. 2), an oscillating mirror, a rotating mirror, a rotating holographic disk, or the like. The scan mechanism 214 scans the illumination beam 208 creating a scan pattern of one or more scan lines. In a preferred embodiment of the barcode scan module 200, the photodetector 212 may comprise any means for converting collected light 220 into an electronic signal voltage which varies monotonically with the intensity of the light 220, including but not limited to a photodiode or a photomultiplier.

In a preferred embodiment of barcode scan module 200 and the integral illumination source/optical collection system 202 may be rigidly mounted on a common circuit board 230 carrying the photodetector 212. Other electronics associated with the barcode reader may also be implemented on this same circuit board, including one or more of the following: power supply and control electronics for the illumination source 208; power supply and control electronics for the scan mechanism 214; power supply and control electronics for the photodetector 212; and signal processing and/or decoding electronics 216. This integration of integrated illumination source/optical collection system 202, photodetector 212, and electronics on a single circuit board 230 (or alternately interconnected boards arranged compactly, e.g., orthogonally) allows significant size reduction of the barcode scan module 200 and of the overall barcode reader. The scan mechanism itself may also be mounted on the circuit board such as disclosed in U.S. Pat. No. 5,475,206 herein incorporated by reference.

Figure 3:
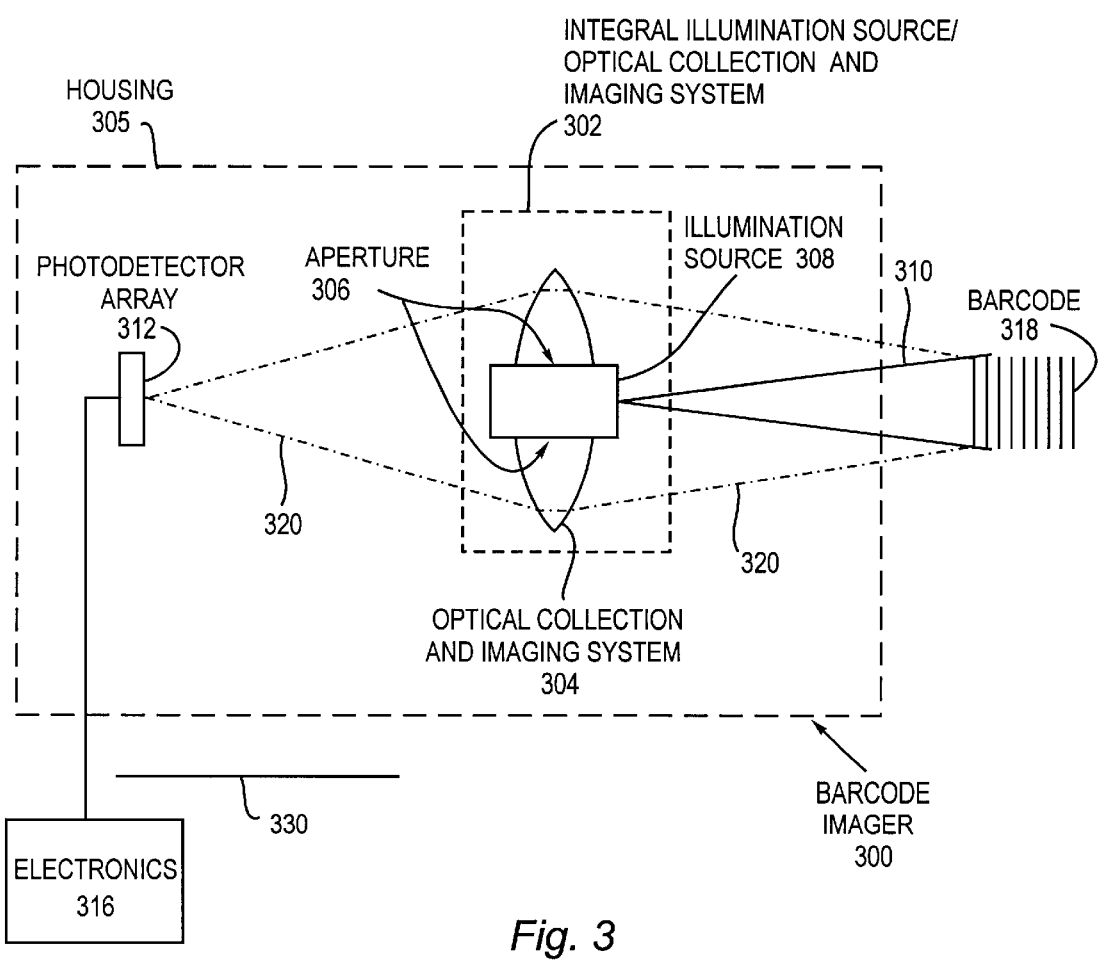
FIG. 3 is a schematic of a line imaging data reader according to a second embodiment of the present invention.

FIG. 3 illustrates a preferred embodiment of a barcode imager 300 with an integral illumination source/optical collection and imaging system 302. The barcode imager of FIG.3 comprises:

an integrated illumination source/imaging system 302 comprising (a) an optical collection and imaging system 304 with an interior aperture 306 and (b) a light source 308 for producing an illumination beam 310, the light source 308 being rigidly mounted within the interior aperture 306 of optical collection and imaging system 304; and a multi-element photodetector array 312.

The barcode imager 300 and signal processing and decoding electronics 316 together comprise a barcode reader all disposed within a housing 305.

In a preferred embodiment of barcode imager 300, the illumination source 308 may comprise a visible laser diode with a divergent illumination beam 310. The illumination beam 310 illuminates the entire barcode 318 so that an adequate image of barcode 318 can be detected by photodetector array 312. Alternately, barcode imager 300 may incorporate any illumination source 308 which produces a sufficiently intense illumination beam 310 which is wide enough to illuminate the entire barcode and which is sufficiently uniform to produce a readable image of barcode 318 on photodetector array 312. Possible illumination sources may include, for example, divergent visible laser diodes (VLDs), light emitting diodes (LEDs), or other suitable light sources.

In a preferred embodiment of barcode reader 300, the integral light source/optical collection and imaging system 302 comprises one single-focus lens 304 with a central aperture 306. The illumination source 308 is rigidly mounted within central aperture 306. The illumination source 308 may comprise a plurality of VLDs or LEDs arranged in a suitable array, such as for example a linear array to produce a desired geometry for the illumination beam 310. The lens 304 collects the reflected and/or backscattered light 320 from barcode 318 and produces an image of barcode 318 on photodetector array 312. The voltages thus generated by the array 312 are then passed to signal processing and/or decoding electronics 316. Alternately, embodiments of barcode imager 300 may incorporate other optical collection and imaging systems, provided that illumination source 308 is rigidly mounted within an element of the optical collection and imaging system 304. By mounting or otherwise forming the illumination source 308 within the optical collection system 304 to produce a single integral unit 302, the number of components required is reduced and proper alignment of the illumination source and the optical collection system is more readily assured.

Suitable optical collection systems include but are not limited to: one multi-focus lens element; a plurality of single- and/or multi-focus lens elements; or one or more (possibly optically powered) mirrors, either alone or in combination with one or more lenses. The lenses may be refractive or diffractive in nature. Such optical collection and imaging systems are described in U.S. application Ser. No. 08/576,203 filed Dec. 21, 1995 to Olmstead et al., which is hereby incorporated by reference.

In a preferred embodiment of barcode imager 300, the photodetector array 312 may comprise a linear or areal CCD array or a linear or areal CMOS active pixel sensor array. CCD arrays are further described in Olmstead et al. U.S. Ser. No. 08/576,203, referred to above. CMOS active pixel sensors are described fully in Olmstead et al. U.S. provisional Application Serial No. 60/003,256 which is hereby incorporated by reference.

In a preferred embodiment of barcode imager 300, the integral illumination source/optical collection and imaging system 302 may be rigidly mounted above or on a circuit board 330 carrying photodetector array 312. Other electronics associated with the barcode reader may also be implemented on this same circuit board 330, including one or more of the following: power supply and control electronics for the illumination source 308; power supply, control, and readout electronics for the photodetector array 312; and signal processing, and/or decoding electronics 316. This integration of illumination source/optical collection and imaging system 302, photodetector array 312, and electronics on a single circuit board 330 (or alternately interconnected boards arranged compactly, e.g., orthogonally) may produce significant size reduction of the barcode imager 300 and the barcode reader.

Figure 4:
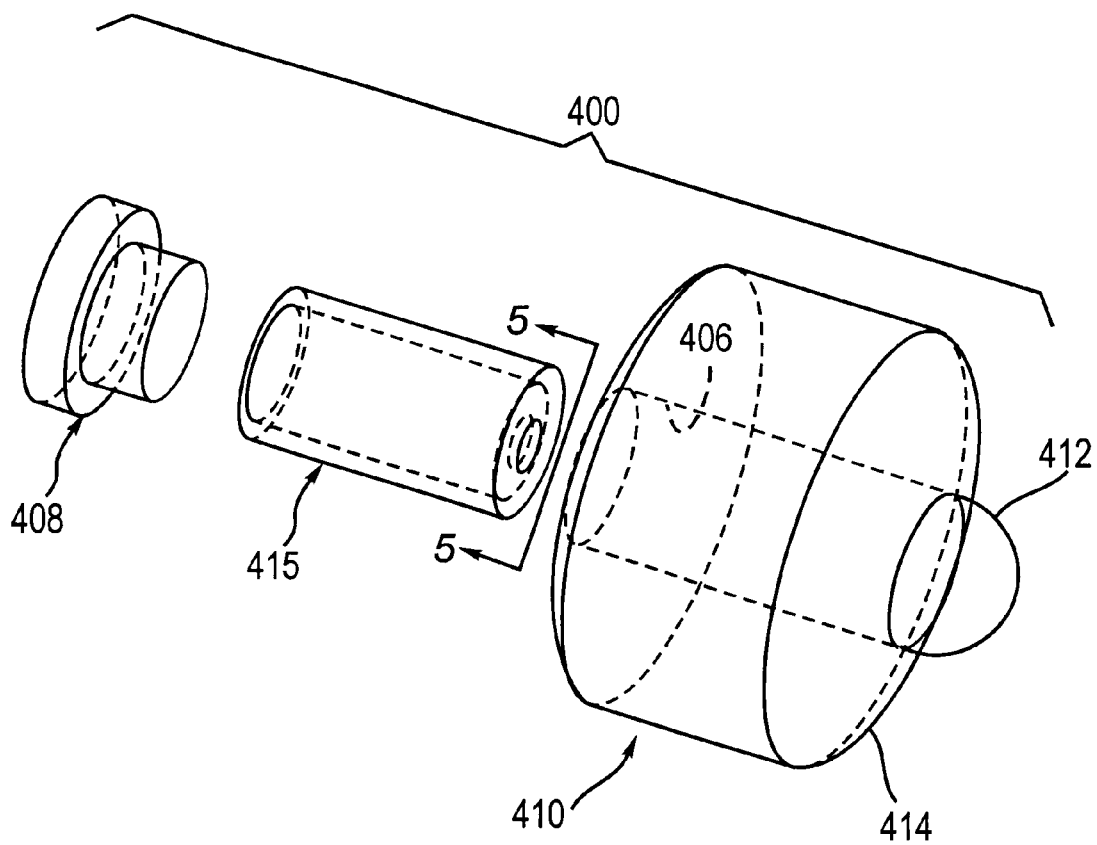
FIG. 4 is an exploded view of an alternate preferred embodiment of a lens and light source combination.
Figure 5:
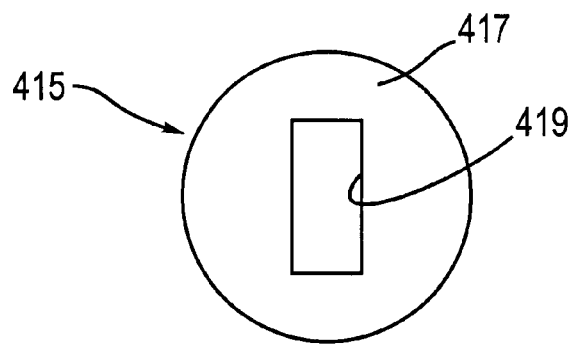
FIG. 5 is a front view of FIG. 4 taken along line 5—5.

FIGS. 4–5 illustrate an alternate embodiment of light source and lens configuration 400. The light source 408 shown as a laser diode is installed in a cylindrical aperture or bore 406 within the lens module 410. The lens module 410 includes an inner beam focusing lens section 412 an outer collection lens section 414. The inner focusing lens section 412 focuses and/or shapes the outgoing beam produced by the laser diode 408. The inner focusing lens section 412 may be located inside the outer collection lens section 414 or on the outside surface as in FIG. 4. The outer lens collection section 414 disposed about the inner bore 406 collects and focuses return light reflected off the target onto a detector (such as illustrated in the configurations of FIG. 2 or 3). The lens assembly 410 (including both the lens sections 412, 414) is preferably an integrally formed molded plastic optic. The inner focusing lens section 412 may comprise a concave or convex lens element, a fresnel lens element, a diffractive optic or some other suitable lens optic or combination thereof Alternately, additional focusing components and/or reflectors can assist in directing/collecting return light to the detector.

A beam shaping optic 415 may be incorporated within the lens assembly 410, installed in the bore 406 or installed over the laser diode 408. As shown in FIG. 5, the lens insert 415 includes a central opening 419 disposed within a more opaque or frosted (partially transmissive) outer portion 417. The opening 419 may be rectangular as shown in FIG. 5 (or some other suitable shape such as round) for shaping the outgoing beam. The opening 419 may comprise mere beam shaping mechanism, or alternately may comprise a diffractive optic such as described in U.S. Pat. No. 5,479,011 incorporated by reference herein. The diffractive optic/beam shaping optic 415 may be molded into the lens assembly 410, formed on the diode 408, formed as a cap for the diode 408, or formed as an insert into the lens assembly 410.

Positioning the laser diode 408 within the lens assembly 410 improves electrical insulation of the diode and facilitates mechanical positioning of the light source relative to the lens elements.

The present invention has been set forth in the form of its preferred embodiments. It is nevertheless intended that modifications to the disclosed barcode readers may be made by those skilled in the art without altering the essential inventive concepts set forth herein.

What is claimed is:

1. A data reading system comprising
   an illumination source producing an illumination beam along an outgoing path for illuminating an object to be read;
   a detector positioned behind the illumination source;
   a bifocal lens element positioned in the outgoing path and comprising an outer collection lens section for collecting light reflecting off the object and focusing the light onto the detector and an inner beam focusing lens section for focusing the illumination beam;
   wherein the illumination source is rigidly mounted within the bifocal lens element and wherein the outer collection lens section and the inner beam focusing lens section comprise an integrally formed molded plastic optic.

2. A data reading system according to claim 1 wherein the outer collection lens section comprises a single-focus lens element.

3. A data reading system according to claim 1 wherein the inner beam focusing lens section comprises a single-focus lens element.

4. A data reading system according to claim 1 further comprising
   a housing; and
   a printed circuit board mounted within the housing, wherein the bifocal lens element and the detector are rigidly mounted on the printed circuit board.

5. A data reading system according to claim 1 wherein the illumination source is coaxially positioned in the bifocal lens element.

6. A data reading system according to claim 1 wherein the illumination source comprises a light emitting diode and the detector comprises a detector array.

7. A data reading system according to claim 1 wherein the illumination source comprises a visible laser diode module.

8. A data reading system comprising an illumination source producing an illumination beam along an outgoing path for illuminating an object to be read;
   a detector positioned behind the illumination source;
   a bifocal lens element positioned in the outgoing path and comprising an outer collection lens section for collecting light reflecting off the object and focusing the light onto the detector and an inner beam focusing lens section for focusing the illumination beam, wherein the illumination source is rigidly mounted within the bifocal lens element;
   an aperture positioned in the outgoing path adjacent the illumination source between the illumination source and the inner beam focusing lens section.

9. A data reading system comprising
   an illumination source producing an illumination beam along an outgoing path for illuminating an object to be read;
   a detector positioned behind the illumination source;
   a bifocal lens element positioned in the outgoing path and comprising an outer collection lens section for collecting light reflecting off the object and focusing the light onto the detector and an inner beam focusing lens section for focusing the illumination beam, wherein the illumination source is rigidly mounted within the bifocal lens element;
   an aperture positioned in the outgoing path adjacent the illumination source, wherein the aperature is integrally molded with the bifocal lens element.

10. A data reading system according to claim 1 wherein the outer collection lens section is part of an optical collection system having a plurality of lens elements.

11. A method for data reading comprising the steps of:
    generating an illumination beam from an illumination source along an outgoing optical path toward and illuminating an object to be read;
    forming a lens assembly as an integrally formed molded plastic optic having a central bore, an outer collection lens section and an inner beam focusing section and positioning the lens assembly in the outgoing optical path;
    positioning the illumination source in the central bore of the lens assembly;
    passing the outgoing illumination beam through the inner beam focusing section;
    directing light reflected off the object through the outer collection lens section and toward a detector.

12. A method for data reading according to claim 11 further comprising the step of focusing an entire image of the object to be read onto a detector array.

13. A barcode scanner comprising a lens assembly having an outer collection element, an inner outgoing beam focusing element, and an inner bore formed in the outer collection element; a light source rigidly mounted within the inner bore of the outer collection element; a detector; and a printed circuit board, wherein the outer collection element and the inner outgoing beam focusing element comprise an integrally formed molded plastic optic.

14. A bar code scanner according to claim 13, wherein the detector and the lens assembly are rigidly mounted on the printed circuit board.

* * * * *

UNITED STATES PATENT AND TRADEMARK OFFICE
CERTIFICATE OF CORRECTION

PATENT NO.   : 6,260,763 B1
DATED        : July 17, 2001
INVENTOR(S)  : Svetal et al.

It is certified that error appears in the above-identified patent and that said Letters Patent is hereby corrected as shown below:

<u>Title page,</u>
Please correct the filing date to read: -- February 22, 1999. --

Signed and Sealed this

Twenty-third Day of April, 2002

Attest:

Attesting Officer

JAMES E. ROGAN
*Director of the United States Patent and Trademark Office*